United States Patent
McCoy (10) Patent No.: US 8,818,740 B2
(45) Date of Patent: Aug. 26, 2014

(54) SENSOR-POWERED WIRELESS CABLE LEAK DETECTION

(75) Inventor: Kenneth McCoy, Redwood City, CA (US)

(73) Assignee: Pentair Thermal Management LLC, Menlo Park, CA (US)

( * ) Notice: Subject to any disclaimer, the term of this patent is extended or adjusted under 35 U.S.C. 154(b) by 490 days.

(21) Appl. No.: 13/028,902

(22) Filed: Feb. 16, 2011

(65) Prior Publication Data

US 2011/0202292 A1  Aug. 18, 2011

Related U.S. Application Data

(60) Provisional application No. 61/305,433, filed on Feb. 17, 2010.

(51) Int. Cl.
*G01F 17/00* (2006.01)

(52) U.S. Cl.
USPC ............................................. 702/51; 702/100

(58) Field of Classification Search
USPC .................................................. 702/51, 100
See application file for complete search history.

(56) References Cited

U.S. PATENT DOCUMENTS

| | | | |
|---|---|---|---|
| 2004/0098212 A1* | 5/2004 | Hong et al. | 702/51 |
| 2005/0035144 A1* | 2/2005 | Sacchi | 222/52 |
| 2005/0159905 A1* | 7/2005 | Bond et al. | 702/51 |
| 2007/0000310 A1 | 1/2007 | Yamartino | |
| 2010/0213960 A1* | 8/2010 | Mok et al. | 324/755 |

FOREIGN PATENT DOCUMENTS

| | | |
|---|---|---|
| EP | 1965188 A2 | 9/2008 |
| FR | 2761154 B1 | 3/1997 |
| FR | 2773613 B1 | 1/1998 |
| FR | 2826726 B1 | 6/2001 |
| JP | 2006251918 A | 9/2006 |
| WO | 2009023956 A1 | 2/2009 |

OTHER PUBLICATIONS

Daniel McCauley, Designing your Tesla Coil, Space Cat High Voltage Research Systems, Sep 2003.*
Patrick Griffith, Desinging Switching Voltage Regulator with TL494, Dec 2003.*

* cited by examiner

*Primary Examiner* — John Breene
*Assistant Examiner* — Eman Alkafawi
(74) *Attorney, Agent, or Firm* — Quarles & Brady LLP

(57) ABSTRACT

Techniques for leak detection are described. A leak detection module may include a plurality of wires comprising one or more collection points. The leak detection module may further include a capacitor configured to store a charge for powering the module during a power-off state and a plurality of switches to be controlled by a processor. The processor may initiate a predetermined switching sequence when a power-off state has been detected. During the switching sequence, leak detection data may be collected at the one or more collection points. The collected leak detection data may be stored in a set of registers. The leak detection module may transmit the stored leak detection data. Other embodiments are described and claimed.

24 Claims, 4 Drawing Sheets

SENSOR-POWERED WIRELESS CABLE LEAK DETECTION

CROSS-REFERENCE TO RELATED APPLICATIONS

This application claims priority to U.S. Provisional Patent Application No. 61/305,433, filed Feb. 17, 2010, entitled "Sensor Powered Wireless Cable Leak Detection System," which is herein incorporated by reference in its entirety.

FIELD OF THE INVENTION

Embodiments of the present disclosure relate to leak detection on a wire circuit using a networked leak detection module. More particularly, the present disclosure relates to collecting leak detection data by the leak detection module during a switching sequence that occurs during a power-off state. Leak detection information may be transmitted from the leak detection module during a power-on state.

BACKGROUND OF THE INVENTION

Leak detection systems may be used to detect liquid leaks, such as water, fuel or hydrocarbons, for example. Leak detection systems are typically used in buildings or infrastructure that may be at risk for catastrophic loss due to liquid leaks, such as museums, data centers or fuel storage facilities. Leak detection systems commonly use a leak detection cable containing one or more wire circuits and a plurality of leak detection modules. Typically, the leak detection cable is placed at or near potential leakage sites and the system is configured to transmit a leak detection signal to an alarm system when a leak is detected. The leak detection system may include information about the location of the leak and the time that the leak was detected. A leak detection system likely requires a leak detection cable, a power supply and telemetry capabilities to transmit an indication that a leak has been detected to an alarm system.

Leak detection systems often utilize small, network instruments, such as sensor interface modules (SIMs) that are used to measure key electrical parameters of a four-wire leak detection circuit. The SIMs convert the measured analog values to digital data that can be transmitted to an alarm system including an alarm panel, which may indicate to users the presence and location of a leak. Even smaller "smart" connecters can be used within a leak detection system to provide leak detection at segmented intervals, such as every 15 meters of a leak detection cable. In this manner, many segments of a leak detection system can be independently and simultaneously monitored and reported.

Many current leak detection techniques use leak detection cables including four-wire circuits arranged in two loops with an end-of-the-line measurement system. However, such a system requires additional separate cables for power supply and telemetry functions. Other techniques for leak detection use more complex eight-wire systems that utilize dedicated wires for power supply, digital telemetry and leak detection within the same cable. For example, two wires may be used as the power supply, two wires may be used for digital telemetry and the remaining four wires may be used for leak detection. However, such complex systems require more expensive cables that include eight wires. Further, these eight-wire systems may not be compatible with many previously installed four-wire leak detection systems. Therefore, a need exists for a four-wire leak detection system that allows for power supply, telemetry and leak detection using four-wire cables. It is with respect to these and other considerations that the present improvements have been needed.

SUMMARY OF THE INVENTION

The following presents a simplified summary in order to provide a basic understanding of some novel embodiments described herein. This summary is not an extensive overview, and it is not intended to identify key elements or to delineate the scope thereof. Its sole purpose is to present some concepts in a simplified form as a prelude to the more detailed description that is presented later.

Various embodiments are generally directed to techniques to provide sensor-powered wireless cable leak detection. Some embodiments are particularly directed to techniques to provide sensor-powered wireless cable leak detection for four-wire leak detection systems. In one embodiment, for example, a leak detection system may comprise a leak detection module including a plurality of wires comprising one or more collection points. The leak detection module may further include a capacitor configured to store a charge for powering the module during a power-off state and a plurality of switches to be controlled by a processor. The processor may initiate a predetermined switching sequence when a power-off state has been detected. During the switching sequence, leak detection data may be collected at the one or more collection points. The collected leak detection data may be stored in a set of registers. The leak detection module may transmit the stored leak detection data during a power-on state. Other embodiments are described and claimed.

Embodiments of the present invention utilize a dual-mode power technique to utilize four-wire leak detection cables for power supply, leak detection and telemetry. In this manner, embodiments of the present invention provide a cost effective technique for leak detection that is compatible with many existing leak detection systems, while providing new segmentation capabilities of more complex leak detection cables.

To accomplish the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Various embodiments are directed to techniques to provide sensor-powered wireless cable leak detection. Some embodiments are particularly directed to techniques to provide sensor-powered wireless cable leak detection using leak detection modules that may provide leak detection, power supply and telemetry functions using a four-wire cable. Further, some embodiments are directed to leak detection systems using a plurality of leak detections modules placed at intervals along a four-wire leak detection cable. As a result, the embodiments can improve affordability, scalability, modularity, extendibility, or interoperability for an operator, device or network.

In one embodiment, a time-sharing technique is used with two of the standard four wires of a sensor circuit. These two wires are used as a "part-time" power bus. During a power-on state, two insulated wires in the standard four-wire sensor cable circuit are used to supply power to a series of independent modules inserted at user-selected points along the sensor cable system. After sufficient time for each module to charge a local storage capacitor, power to the bus is switched off. This power-off trigger event causes each module to commence a switching and measurement cycle. During this time, the microprocessor, switches and A/D circuitry are operating from the power stored in the local storage capacitor.

In an embodiment, data collected during the switching and measurement cycle is stored and compared to data collected during the previous switching and measurement cycle. The on-board microprocessor schedules packet transmission during a power-on state if conditions so warrant. The microprocessor may also transmit a "heartbeat" packet from time to time to reassure that all modules and alarm are in communication.

Other embodiments are described and claimed. Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives falling within the spirit and scope of the claimed subject matter.

Figure 1:
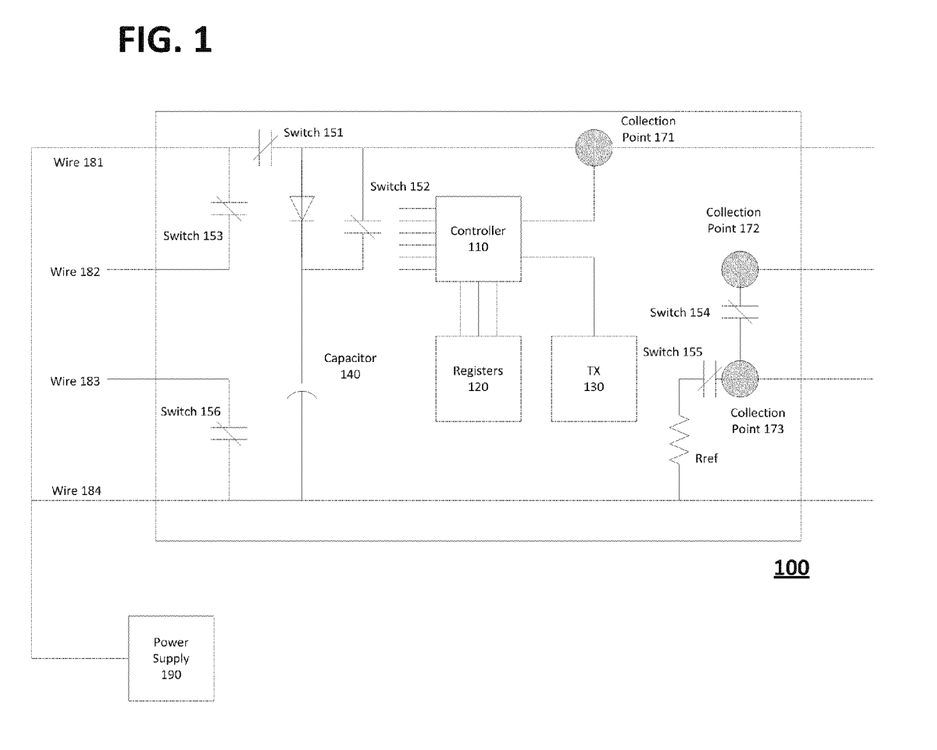
FIG. 1 illustrates an embodiment of a leak detection module.

FIG. 1 illustrates a leak detection module 100 according to one embodiment. Although the leak detection module 100 shown in FIG. 1 has a limited number of elements in a certain topology, it may be appreciated that the leak detection module 100 may include more or less elements in alternate topologies as desired for a given implementation. In an embodiment, leak detection module 100 includes a controller 110 which may be a microprocessor responsible for controlling the various components of leak detection module 100. The controller 110 may comprise various hardware elements, software elements, or a combination of both. Examples of hardware elements of the controller may include devices, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements of the controller may include software components, programs, applications, computer programs, machine programs, operating system software, middleware, firmware, software modules, application program interfaces (API), instruction sets, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Controller 110 is connected to a set of registers 120 which may be one or more storage locations used to store leak detection data collected by controller 110. The registers 120 may include, for example, storage locations for a current set of leak detection data and a previous set of leak detection data. Leak detection data may include information about the location of a leak, severity of a leak, the time a leak was detected or the distance of a leak from a particular leak detection module or alarm system. In an embodiment, leak detection data may be heartbeat data, which is provided to the leak detection module 100 by controller 110 at predetermined time intervals using a timing device. Heartbeat data may be test data that is placed into a leak detection system and may be used to indicate that each module of a leak detection system is operating properly. Heartbeat data may indicate to an alarm system, alarm panel or computer that a particular leak detection module is reading and transmitting leak detection data properly. If an alarm system, alarm panel or computer does not receive heartbeat data from each leak detection module at the predetermined time, an indication may be given that the leak detection system has one or more faulty modules. The embodiments are not limited to this example.

Registers 120 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information.

In an embodiment, controller 110 may be connected to transmitter 130, which may be used to transmit leak detection data stored within the registers 120. The transmitter 130 may be a low-power transmitter that transmits at 900 MHz, for example. The transmitter 130 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The transmitter 130 may include various types of standard communication elements, such as one or more communications interfaces, network interfaces, network interface cards (NIC), radios, wireless transmitters/receivers (transceivers), wired and/or wireless communication media, physical connectors, and so forth. The transmitter 130 may communicate with one or more networked devices used to collect and/or report leak detection data, such as alarm systems, alarm panels or computers, for example.

In an embodiment, leak detection data stored within the registers 120 may be transmitted to an alarm panel over one or more wires using a technique called power line carrier telemetry. This technique may be used in addition to, or in the alternative of, transmitting using transmitter 130. In this manner, leak detection systems installed within interference-sensitive areas may avoid using a wireless transmission. In one embodiment, leak detection data may be superimposed on top of the same wires that are used as a power bus during the power-on phase of each operation cycle.

In an embodiment, controller 110 is used to control a plurality of switches, such as switches 151, 152, 153, 154, 155 and 156 which may comprise, for example, low-power on-state resistance FET devices, for example. The controller 110 may initiate a predetermined switching sequence using switches 151, 152, 153, 154, 155 and 156. The predetermined switching sequence may be initiated when controller 110 detects a particular state of the leak detection module 100, such as a power-off state. An example of a predetermined switching sequence is illustrated within a timing diagram in FIG. 3, which will be described in more detail below.

In one embodiment, the leak detection module 100 is connected to a power supply and other leak detection modules using a plurality of wires, such as wires 181, 182, 183 and 184. The plurality of wires may comprise a single four-wire leak detection cable, for example. The leak detection cable may be a leak detection cable commonly used within the art. Such leak detection cables generally comprise first and second conductors spaced apart from one another. If a liquid is present, a circuit is created between the sensing wires. If there is not enough liquid present to create contact between the first and second conductors there will be no connection. The leak detection cable may be a TRACETEK® sensing cable produced by TYCO THERMAL CONTROLS®, for example. In an embodiment, wires 181 and 184 may comprise 28 AWG copper wires. Wires 181 and 184 may be utilized as a power bus and be responsible for the delivery of power to the leak detection module 100 from a power supply. The power bus comprised of wires 181 and 184 may have a maximum length, such as 1000 meters, for example. In addition, wires 181 and 184 may be utilized in a power line carrier telemetry technique, in which leak detection data may be transmitted to an alarm panel over wires 181 and 184 during a power-on state. In an embodiment, wires 182 and 183 may comprise 30 AWG copper electrode wires. The embodiments are not limited to this example.

In one embodiment, the leak detection module 100 may be a component within a larger leak detection system powered by a single head-of-the-line power supply, such as power supply 190, for example. The power supply 190 may be used to power up to 50 leak detection modules, for example. The power supply 190 may provide a rail voltage of 48 VDc and include a timing circuit. The timing circuit of the power supply 190 may be used to switch from a power-on state to a power-off state in predetermined time intervals. For example, a power-on state may be used for several seconds and a power-off state may last a shorter period, such as 0.5 seconds. The embodiments are not limited to this example.

In an embodiment, wires 181 and 184 may act as a power bus to leak detection module 100. The power supply 190 may also include a current source to be used as a current throttle. In this manner, a large voltage drop in the power bus loop may be avoided. During power-on states, power supply 190 may provide power to charge a capacitor 140 and transmit data using transmitter 130. Capacitor 140 may be configured to store enough charge to power the components of leak detection module 100 during a power-off state. During a power-off state, the leak detection module 100 may perform the predetermined switching sequence and collect leak detection data.

In an embodiment, the leak detection module 100 may include one or more collection points, such as collection points 171, 172 and 173. In an embodiment, collection 171 may continuously monitor the current power state of the leak detection module 100. Collection points 172 and 173 may be used to collect leak detection data at predetermined times during the predetermined switching sequence, which takes place during a power-off state. Leak detection data may include information about the location of a leak, severity of a leak, the time a leak was detected or the distance of a leak from a particular leak detection module or alarm system. The embodiments are not limited to this example.

Figure 2:
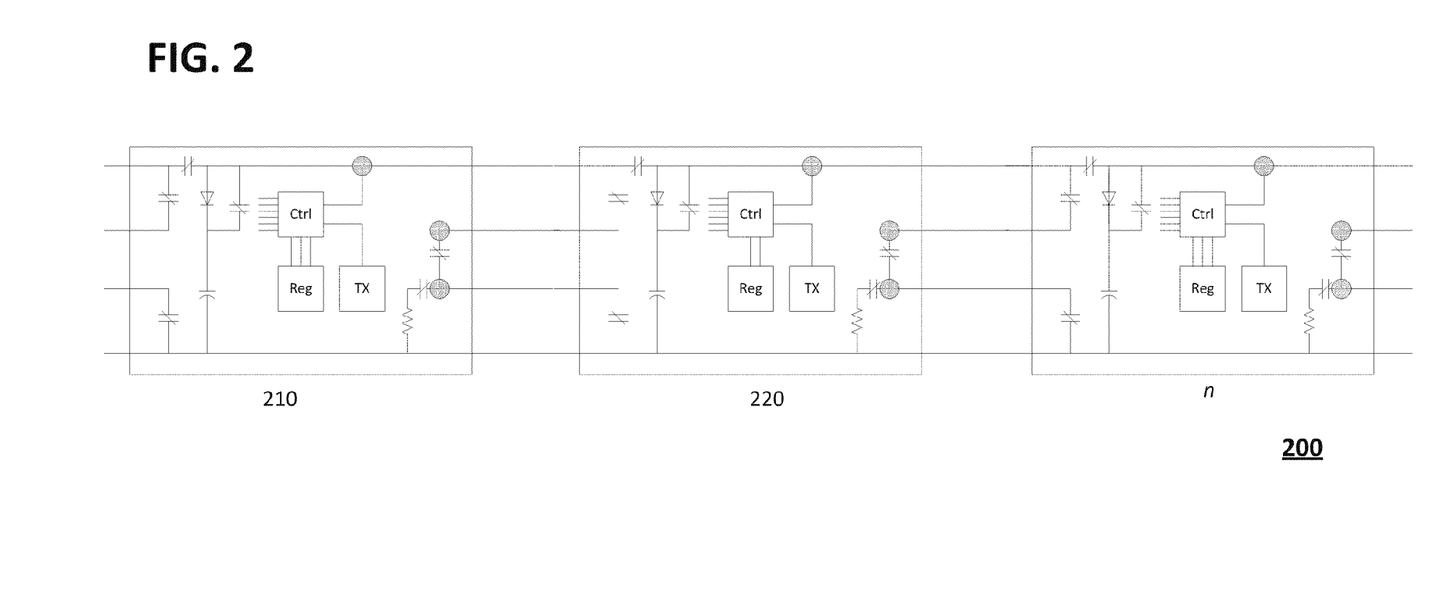
FIG. 2 illustrates an embodiment of a leak detection system.

FIG. 2 illustrates one embodiment of a leak detection system 200. Leak detection system 200 may include one or more leak detection modules, such as leak detection module 100 of FIG. 1. As illustrated, leak detection system 200 includes leak detection modules 210, 220 through n, where n is a positive integer number of leak detection modules. Leak detections modules included within leak detection system 200 may be placed along a four-wire leak detection cable at a uniform interval distance to create segments that may be simultaneously monitored. In this manner, each leak detection module may represent a predetermined length of leak detection cable, such as 5 or 100 meters. In an embodiment, a four-wire leak detection cable, such as that described above with respect to FIG. 1 may be used. A two-wire power bus may be created using two of the wires, such as wire 181 and wire 184 from FIG. 1. The negative rail may be continuous from an end-of-line power supply to the most distant module. The positive rail may be interrupted at each of the modules by a low on-state FET switch, for example.

In an embodiment, a trust and be trusted approach may be taken within the leak detection system. In this approach, each leak detection module trusts that the leak detection modules before and after it are performing the same leak data collection function during simultaneous switching sequences. In this manner, each module may make a complete set of measurements for accurate leak detection and location but only when similar modules before and after are completing the same sequence of switch closures and measurement on a mutual pre-defined schedule simultaneously triggered by a commonly shared recognition of power-off voltage drop. Likewise, each leak detection module will make transmissions of leak detection data and charge their respective capacitors during a power-on state.

Figure 3:
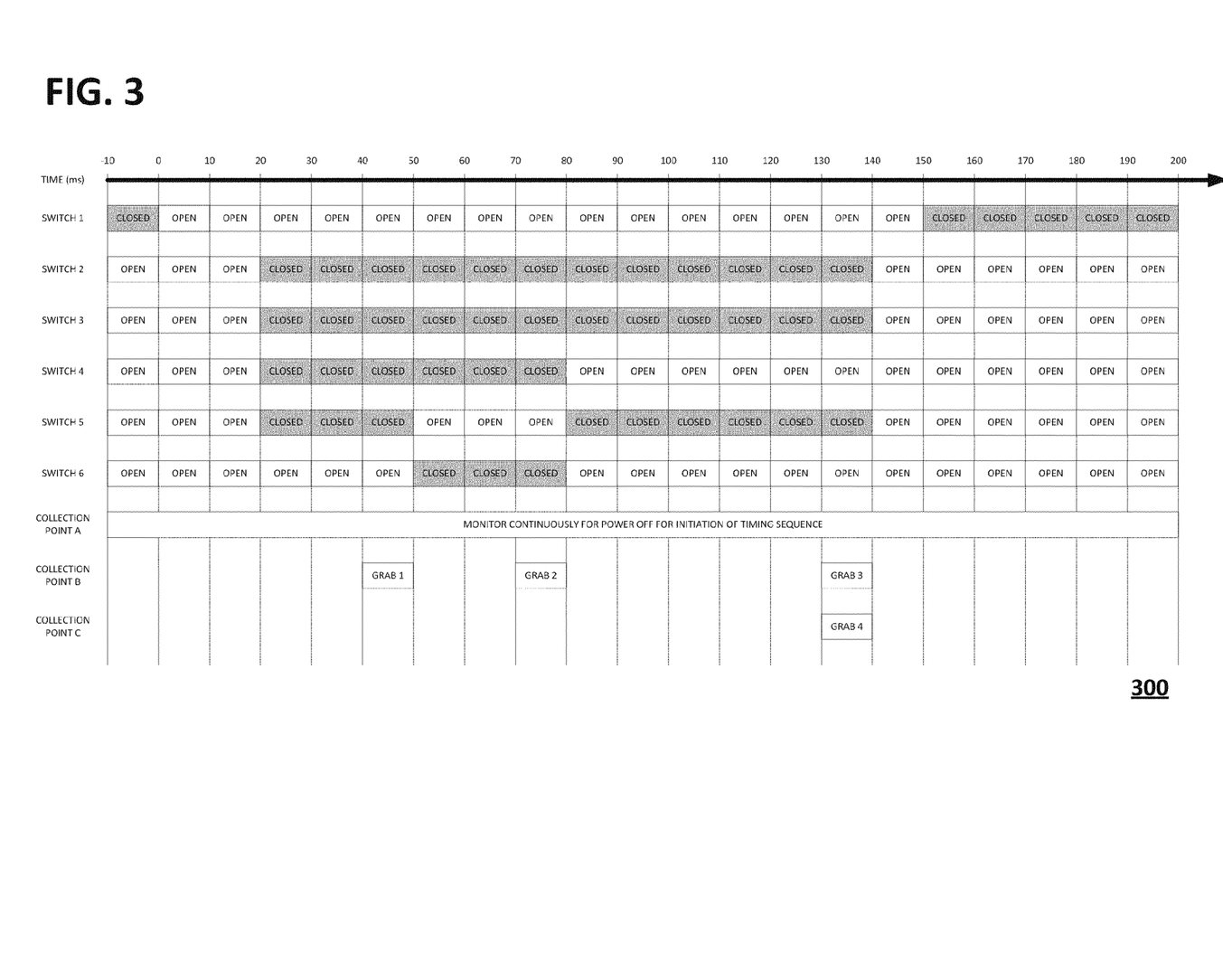
FIG. 3 illustrates a timing diagram for an embodiment of a leak detection module.

FIG. 3 illustrates a timing diagram for an embodiment of a leak detection module. In an embodiment, beginning at $t_0$, each leak detection module within a leak detection system may perform the same routine, or switching sequence, over a predetermined time period, such as 200 or 500 milliseconds. During this switching sequence, each leak detection module may make a total of four voltage measurements. More or less voltage measurements may be made based upon particular design decisions.

As illustrated within FIG. 3, the switches are set to a given configuration for an initial time period to allow for capacitive effects to dampen. In an embodiment, at time 40, a collection point B makes a first leak data collection, or grab, which may be collection point 172 of FIG. 1. Another leak data collection may be made at time 70 using collection point B. Third and fourth data collections may be made at time 130, one each from collections points B and C. Collection point C may be the same as collection point 173 of FIG. 1.

The data collected during the switching sequence may be stored within a set of "current value" registers. Current value registers may be compared with "previous value" registers, which include data collected during a previous power-off state. A set of threshold rules may be applied to the comparison to determine whether the data within the current value registers is sufficiently different from the previous value registers to warrant a data transmission indicating a leak. If a data transmission is warranted, a leak data packet may be prepared for transmission and transmitted to an alarm system or alarm panel. Likewise, if heartbeat data is detected, a transmission packet containing the heartbeat data may be prepared for transmission and transmitted to an alarm system or alarm panel. Leak detection data or heartbeat data may be transmitted to an alarm panel during a power-on state using a transmitter or using the power bus of a leak detection module.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
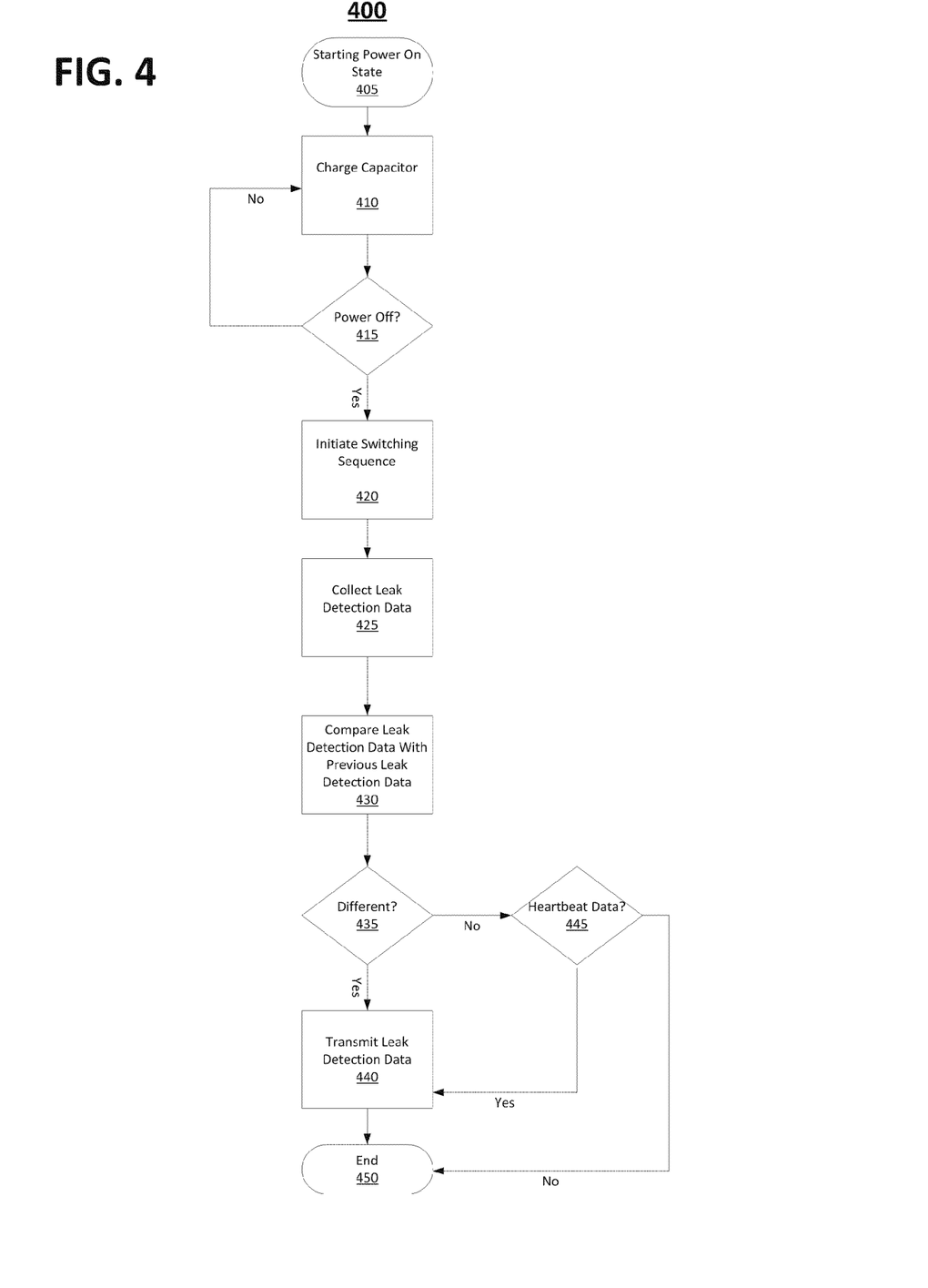
FIG. 4 illustrates a logic flow for an embodiment of leak detection system.

FIG. 4 illustrates one embodiment of a logic flow 400. The logic flow 400 may be representative of some or all of the operations executed by one or more embodiments described herein. In the illustrated embodiment shown in FIG. 4, the logic flow 400 starts a power-on state at block 405. For example, one or more wires comprising a leak detection cable may begin providing power to a leak detection module, such as leak detection module 100 described above with respect to FIG. 1. The power-on state may be started at predetermined intervals and initiated by a timer within a power supply.

The logic flow 400 may charge a capacitor of a leak detection module during the power-on state at block 204. For example, a capacitor capable of providing power to a leak detection module during a power-off state may be charged during a power-on state. The power-on state may be configured to be a predetermined time period based upon the design of a particular leak detection system or leak detection module. For example, a power-on state may be a predetermined time period based upon the capacitors used or the power requirements of a particular leak detection system or leak detection module. The embodiments are not limited to this example.

The logic flow 400 may determine whether a predetermined time period for a power-on state has ended at block 415. Alternatively, block 415 may determine whether a capacitor of a leak detection module has been fully charged. When a predetermined time period for a power-on state has expired and/or a capacitor of a leak detection module has been fully charged, a power-off state may be entered. In this manner, one or more wires within a leak detection cable may be temporarily used for leak detection instead of being used for power supply. During a power-off state, because one or more power supply wires are used for leak detection, a leak detection module may be powered using the capacitor charged during a previous power-on state. The embodiments are not limited to this example.

In an embodiment, one or more collection points within a leak detection module may be used to continuously monitor the state of the leak detection module. For example, the one or more collection points may be used to detect whether the module is in a power-off or a power-on state. At block 420, a controller of a leak detection module may initiate a predetermined switching sequence when the one or more collection points have detected a power-off state. The switching sequence may be executed using a plurality of switches within a leak detection module. The plurality of switches may comprise low on-state resistance FET devices, for example. The embodiments are not limited to this example.

The logic flow 400 may collect leak detection data at block 425. Leak detection data may include data representing the location of a leak, distance of a leak from a particular alarm system, severity of a leak, the time that a leak was detected or whether a leak has been previously detected. The leak detection data may be collected at one or more predetermined times within a switching sequence. At each predetermined time, one or more collection points within a leak detection module may collect leak detection data. The collected leak collection data may then be sent to a controller and stored within a memory, such as a set of registers within a leak detection module. The embodiments are not limited to this example.

The logic flow 400 may compare collected leak detection data with previously collected leak collection data at block 430. For example, a leak detection module may include a set of threshold rules that must be met before leak detection data is considered to indicate a leak. For example, currently collected leak detection data may need to indicate sufficiently different leak detection data than previously collected leak detection data to warrant a transmission of leak detection data. The embodiments are not limited to this example.

The logic flow 400 may make a determination as to whether currently collected leak detection data meets one or more threshold rules for leak detection, such as whether current leak detection data is sufficiently different from previously collected leak detection data, at block 435. If yes, the currently collected leak detection data may be transmitted using a transmitter of a leak detection module. In an embodiment, collected leak detection data may be transmitted using a power line carrier telemetry technique, in which the data is superimposed on one or more power supply wires of a leak detection module. The transmitted leak detection data may be sent during a subsequent power-on state to an alarm system, alarm panel or computer used to monitor the status of a leak detection system. The embodiments are not limited to this example.

The logic flow 400 may make a determination as to whether currently collected leak detection data contains heartbeat data at block 445. Heartbeat data may be test data that is placed into a leak detection system at predetermined intervals by a controller. Heartbeat data may be used to indicate that each module of a leak detection system is operating properly. Heartbeat data may indicate to an alarm system, alarm panel or computer that a particular leak detection module is reading and transmitting leak detection data properly. If an alarm system, alarm panel or computer does not receive heartbeat data from each leak detection module at the predetermined time, an indication may be given that the leak detection system has one or more faulty modules. The embodiments are not limited to this example.

The logic flow 400 may transmit leak detection data containing new leak information or heartbeat information at block 440. Transmissions are to take place during power-on states. The transmission may be made by a transmitter of a leak detection module, such as a low power 900 MHz transmitter, for example. Alternatively, a transmission may be made using a power line carrier telemetry technique, in which the data is superimposed on one or more power supply wires of a leak detection module. A receiving system, such as an alarm system or alarm panel, may accept the transmitted leak detection data and evaluate the data for new leaks or system performance. Information about any detected leaks may be displayed to a user on a display device included within an alarm panel. The embodiments are not limited to this example.

The logic flow 400 may end, either with the transmission of leak detection data or no transmission of leak detection data, at block 450. Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A leak detection module, comprising:
   a plurality of wires comprising one or more collection points;
   a capacitor for powering the module during a power-off state;
   a plurality of switches;
   a processor configured to detect the beginning of the power-off state and to initiate and control a predetermined switching sequence for the plurality of switches during the power-off state; and
   a set of registers configured to store leak detection data collected at the one or more collection points during the predetermined switching sequence.

2. The leak detection module of claim 1, further comprising:
   a transmitter configured to transmit the stored leak detection data, wherein the stored leaked detection data is transmitted during a power-on state.

3. The leak detection module of claim 1, wherein the plurality of wires are configured to transmit the stored leak detection data, wherein the stored leaked detection data is transmitted during a power-on state.

4. The leak detection module of claim 1, wherein the processor is further configured to store heartbeat data in the set of registers as the leak detection data at a predetermined time interval.

5. The leak detection module of claim 1, wherein the stored leak detection data is transmitted when the stored leak detection data is determined to be different than a previously stored leak detection data or the stored leak detection data is determined to be heartbeat data.

6. The leak detection module of claim 2, wherein the transmitter is a 900 MHz wireless transmitter.

7. The leak detection module of claim 1, wherein the plurality of cables comprises two 28 AWG copper wires and two 30 AWG copper electrode wires, wherein the two 28 AWG copper wires are used to provide power to the leak detection module.

8. The leak detection module of claim 1, wherein the plurality of switches comprise low on-state resistance FET devices.

9. A leak detection system, comprising:
   a plurality of leak detection modules connected using a plurality of wires, each leak detection module comprising:
   a capacitor for powering the module during a power-off state;
   a plurality of switches;
   a processor configured to detect the beginning of the power-off state and to initiate and control a predetermined switching sequence for the plurality of switches during the power-off state;
   one or more collection points each in electrical communication with one or more of the plurality of wires; and
   a set of registers configured to store leak detection data collected at the one or more collection points during the predetermined switching sequence.

10. The leak detection system of claim 9, wherein each leak detection module further comprises:
   a transmitter configured to transmit the stored leak detection data;
   wherein the stored leak detection data is transmitted by each leak detection module during a power-on state.

11. The leak detection system of claim 9, wherein the plurality of wires are configured to transmit the stored leak detection data, wherein the stored leak detection data is transmitted during a power-on state.

12. The leak detection system of claim 9, wherein the processor is further configured to store heartbeat data in the set of registers as the leak detection data at a predetermined time interval.

13. The leak detection system of claim 9, wherein the stored leak detection data is transmitted when the stored leak detection data is determined to be different than a previous stored leak detection data or the stored leak detection data is determined to be heartbeat data.

14. The leak detection system of claim 10, wherein the transmitter is a 900 MHz wireless transmitter.

15. The leak detection system of claim 9, wherein the plurality of cables comprises two 28 AWG copper wires and two 30 AWG copper electrode wires, wherein the two 28 AWG copper wires are used to provide power to each leak detection module.

16. The leak detection system of claim 9, wherein the plurality of switches comprise low on-state resistance FET devices.

17. A method for leak detection, the method comprising the steps of: starting a power-on state within a leak detection module;
charging a capacitor of the leak detection module during the power-on state, wherein power is provided using at least one of a plurality of wires of the leak detection module;
detecting a power-off state by a processor of the leak detection module;
initiating, by the processor, a predetermined switching sequence for a plurality of switches within the leak detection module;
collecting, leak detection data at one or more collection points within the leak detection module; and
storing the collected leak detection data within a set of registers of the leak detection module.

18. The method of claim 17, further comprising the step of transmitting the stored leak detection data using a transmitter of the leak detection module, wherein each leak detection module transmits the stored leak data during a power-on state.

19. The method of claim 17, further comprising the step of:
transmitting the stored leak detection data using the plurality of wires, wherein the stored leak detection data is transmitted during a power-on state.

20. The method of claim 17, further comprising:
storing, by the processor, heartbeat data in the set of registers as the leak detection data at a predetermined time interval.

21. The method of claim 17, further comprising:
determining whether the stored leak detection data is different than a previously stored leak detection data;
determining whether the stored leak detection data is heartbeat data; and
transmitting the stored leak detection data if the stored leak detection data is different than the previously stored leak detection data or if the stored leak detection data is heartbeat data.

22. The method of claim 18, wherein the transmitter is a 900 MHz wireless transmitter.

23. The method of claim 17, wherein the plurality of cables comprises two 28 AWG copper wires and two 30 AWG copper electrode wires, wherein the two 28 AWG copper wires are used to provide power to the leak detection module.

24. The method of claim 17, wherein the plurality of switches comprise low on-state resistance FET devices.

* * * * *